Feb. 5, 1935.  G. K. GARRETT  1,989,750
METHOD OF MANUFACTURING LOCK WASHERS
Filed Oct. 3, 1934  2 Sheets-Sheet 1
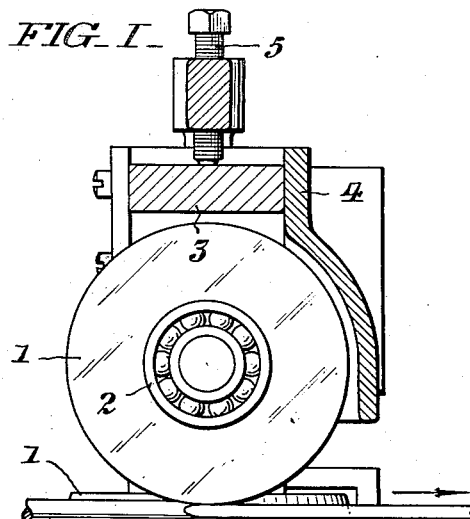
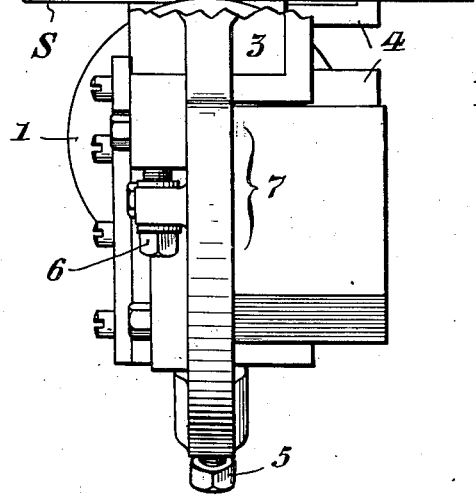
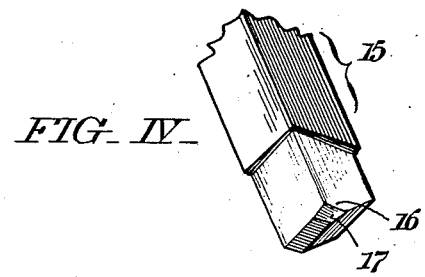
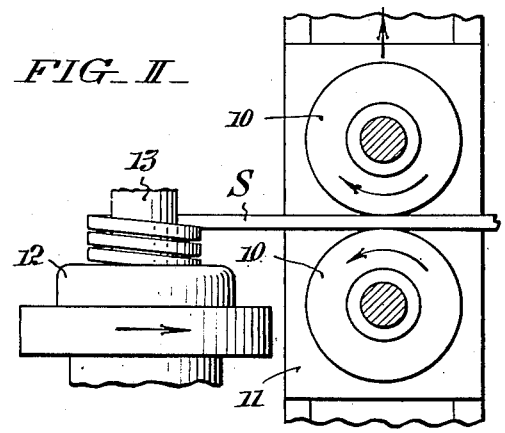
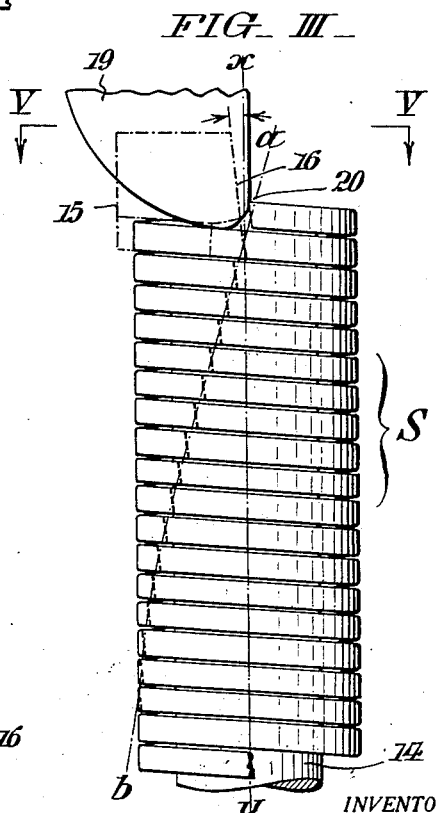
WITNESSES:
Hubert Fuchs
William Bell, Jr.
INVENTOR:
George K. Garrett,
BY Fraley Paul
ATTORNEYS.

Feb. 5, 1935.  G. K. GARRETT  1,989,750
METHOD OF MANUFACTURING LOCK WASHERS
Filed Oct. 3, 1934   2 Sheets-Sheet 2
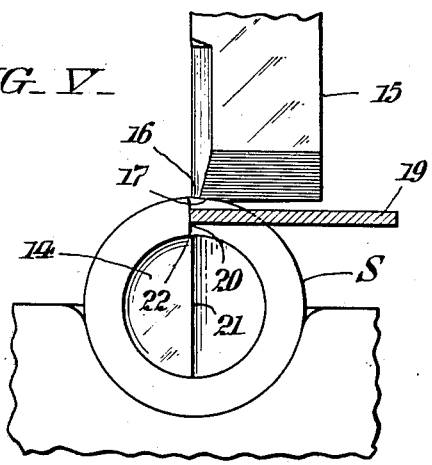
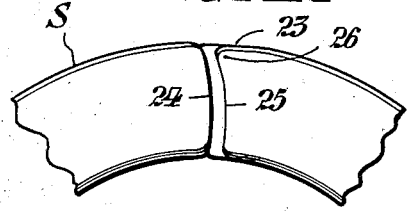
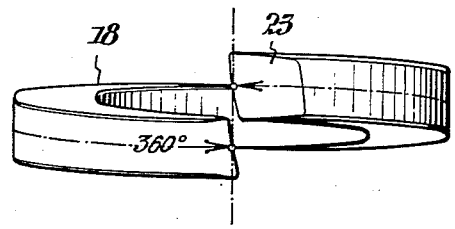
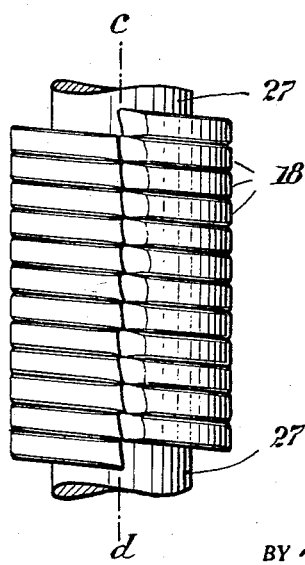
WITNESSES:
Hubert Fuchs
William Bell, Jr.
INVENTOR:
George K. Garrett,
BY Frawy Paul
ATTORNEYS.

Patented Feb. 5, 1935

1,989,750

UNITED STATES PATENT OFFICE 1,989,750

METHOD OF MANUFACTURING LOCK WASHERS

George K. Garrett, Bryn Mawr, Pa.

Application October 3, 1934, Serial No. 746,637

9 Claims. (Cl. 10—86)

This invention relates to a method of manufacturing lock washers, and more particularly to a method of manufacturing washers of the split-ring type in such manner that one washer will not interlink or become entangled with another.

Heretofore it has been proposed to provide special shapes for the ends of washers to prevent interlinking and thus to save the time and labor involved in disentangling washers which have been shipped in bulk. It is readily apparent that interlinking may be prevented by having the ends of a washer closely spaced and formed with sharp angles, or by providing specially shaped ends or projections, or by overlapping the ends in one direction or another, so as to obstruct the passage of one washer through the gap between the ends of another like-formed washer. In fact, there are numerous special shapes which will satisfactorily prevent interlinking, and there is no particular difficulty involved as to the geometrical designing of such washers.

However, in the practical art of manufacturing washers, it is a matter of considerable, and often prohibitive, expense to attempt to make washers conform exactly to accurate measurements. Many factors, including particularly the action of stresses inherent in the metal, present difficulties in maintaining such accuracy of manufacture. Moreover, it is undesirable to provide sharp angles at the washer ends, or to provide formations which require special tools, or additional operations, and the users of washers generally prefer a product having plain ends and having no sharp edges or projections.

Accordingly, the object of the present invention is to provide a comparatively simple and inexpensive method of manufacturing washers which avoids the above recited difficulties and at the same time satisfactorily prevents interlinking; and this end is accomplished in part by the manner in which the washers are successively cut from a coiled wire and in part by the manner of treating the wire before cutting and the subsequent heating of the washers after cutting. Moreover, the prevention of interlinking is controlled by careful selection of the metal composition of the stock and by the manner of working the metal, rather than by an attempt to follow precise measurements or to make each article produced the exact counterpart of the others.

Other more specific objects and advantages characterizing my invention will become apparent from the description hereinafter set forth of one example of the practice of the invention, having reference to the accompanying drawings, whereof:

Fig. I represents a view, partly in section and partly in side elevation, of one form of rolling machine which may be used in the manufacture of washers according to my invention.

Fig. II represents a plan view, showing somewhat diagrammatically certain elements of a winding or coiling machine for the second step of the manufacturing process.

Fig. III represents a plan view, showing somewhat diagrammatically certain elements of a cutting-off machine for the third step of the manufacturing process.

Fig. IV represents a perspective view of the cutting tool of the cutting-off machine.

Fig. V represents a cross section of the cutting-off machine, taken as indicated by the arrows V—V of Fig. III.

Fig. VI represents an enlarged plan view, showing the end portions of a finished washer made according to my invention.

Fig. VII represents an enlarged side elevation of the washer; and,

Fig. VIII represents a series of the finished washers in juxtaposed relation on a shaft, showing the extent to which the ends have closed together in the final step of hardening the washers.

The wire stock from which the washers are made should be selected with considerable care. I have found that good results are obtained with spring steel of a relatively high carbon and manganese content, for example, a steel having from .50% to .55% carbon and from .60% to .62% manganese.

In the first step of the manufacturing process, the wire stock S, which is originally of circular cross section, is reduced to a substantially rectangular cross section; and for this purpose there is desirably employed a rolling machine of the type disclosed in my pending application for Letters Patent, Serial Number 650,220, filed January 5, 1933. Such a machine is illustrated in Fig. I of the drawings herein, and comprises generally a group of four radially arranged forging rolls 1 supported by ball bearings 2 and movable journal blocks 3 within holders 4. By proper adjustment of screws 5 and 6, the positions of the journal blocks 3 and their holders 4 within the surrounding frame 7 may be changed, and thus the size of the opening between the contiguous portions of the peripheries of the four forging rolls 1 may be varied.

The wire stock S is passed through the forging rolls 1 in the direction indicated and is rolled to a reduced size, at the same time changing from circular to trapezoidal cross section. It is believed that such a rolling or forging compresses the crystals of the metal without substantial distortion and produces an improved grain structure as compared with wire produced by drawing through a die in which case the crystals are distorted and enlarged. This is particularly advantageous because, in view of the subsequent treatment of the stock, it is essential to preserve the life or springiness of the metal and to avoid drawing it to a point dangerously near or exceeding its elastic limit.

In the second step of the manufacturing process, the wire stock S, as shown in Fig. II, passes through a pair of rolls 10, supported for rotation on a holder 11, which is adapted to move in the direction indicated, to a winding or coiling device including a rotary chuck 12 and a mandrel 13. Care is taken to avoid stressing the metal in the direction of the axis of the coil as the stock is wound on the mandrel 13, and preferably the coil is so wound that there is a substantial gap, as illustrated, between the successive convolutions of each coil. When coiled, the stock assumes a generally helical formation, and the cross section of the wire undergoes transition from a trapezoidal to a more nearly rectangular section.

In the third step of the manufacturing process, the coiled stock S, as shown in Fig. III, is mounted on a shaft 14 and is moved relatively to the shaft in the direction of its longitudinal axis towards a cutting tool 15. The cutting tool 15, shown in perspective in Fig. IV, has a cutting edge 16 which is inclined at a slight angle to the axis $x-y$ of the coil and an adjacent bevelled edge 17 so disposed that it engages, as shown in Fig. V, a substantial portion of the outer surface of one convolution of the coiled stock S. A blade 19 serves as a stop engaging one end of the coil as indicated at 20, and it will be noted that the relative positions of the blade 19 and cutter 15 determine the degrees of arc between each successive cut. In accordance with the practice of the present invention, the blade 19 and the cutter 15 are so positioned that each cut is made at a slight angle to the axis $x-y$ of the coil, and the successive cuts are made less than 360° apart. In Fig. III the successive cuts are indicated by broken lines, the centers of which trace a path as indicated by the line $a-b$. With the successive cuts so applied, the number of rings severed from a coil is obviously greater than the number of convolutions of the coil.

As shown in Fig. V, the end of the shaft 14, which is disposed beneath the cutting tool 15, is cut away throughout one-half its sectional area as indicated at 21. Thus the shaft 14 affords support for the coil stock at the point 22, and permits the cutting tool 15 to pass through the stock with a shearing action, fracturing the metal along substantially regular lines, though no two cuts are likely to be precisely identical. Moreover, with the type of cutting tool shown, one end of each ring severed thereby is somewhat flattened on its outer cylindrical surface, as indicated at 23 in Figs. VI and VII. The result of such a cut is to produce a ring having substantially convex and concave end faces 24 and 25, as indicated in Fig. VI, with the point 26 of one end extended circumferentially by the pressure of the cutting tool.

In the fourth step of the manufacturing process, the cut rings are heated in a furnace to a temperature desirably within a range from 1350° F. to 1650° F., and are subsequently quenched in a bath of oil. As the rings are thus hardened, the heating and quenching fixes the size of the crystals and relieves internal stresses, thus making the product suitable for use as a spring steel washer. As an incident to the hardening of rings which have been made according to the process described, it will be found that there is a substantial drawing together of the ends due to the fact that the wire has been forged or rolled, rather than drawn through a die, in the initial step of the process.

The final step of the process consists in tempering the washers by heating them to a temperature desirably within a range from 375° F. to 450° F. and allowing them to cool gradually. The tempering serves to reduce the hardness, but has little, if any, effect upon the dimensions of the washer.

The finished washers are represented at 18 in Figs. VII and VIII. It will be noted that when a number of the finished washers are placed together on a shaft, such as indicated at 27 in Fig. VIII, with their ends contacting, the points of contact will lie substantially in a plane intersecting the longitudinal axis $c-d$ of the shaft 27. Moreover, each individual washer will have a mean circumference of approximately 360° measured as indicated in Fig. VII from the center of one end face to the center of the other end face, with these points projected upon a plane perpendicular to the axis of the washer. Out of a lot of washers made according to the process herein described, some may have a mean circumference of 360° or slightly less, and others may have a mean circumference of a few degrees more than 360°; and it is to be understood that such variations are permissible. With certain size washers having a mean circumference of 360° or slightly less, it will be found that the washer will not interlink with a like washer because of the character of the shear with which it has been cut from the coiled stock. The irregularity of the fracture and the extension circumferentially of one end of the washer by the pressure of the cutting tool, as indicated at 26 in Fig. VI, will present an obstruction to interlinking. This is particularly true with washers of relatively large size. On the other hand, with a washer made according to the process herein described having a mean circumference of slightly more than 360°, interlinking between two such washers will obviously be prevented. At the same time, the angle at which the cut is made will permit the washer to be compressed and thus to serve satisfactorily as a split ring washer. In this connection I have found that washers made according to the present process have a tendency to expand radially when the ends are compressed axially, so that no difficulty of overlapping in such manner as to prevent compression is encountered with washers which are slightly over 360° in their mean circumference.

According to the present invention the problem of interlinking is controlled in part by the composition of the metal stock, in part by the manner of working the metal and its subsequent heat treatment, and in part by the point of application and the nature of the cut made by the cutting tool. Slight variations in the finished product are permitted, so that it is not necessary to rely upon conformity to exact dimensions. The angle at which the diagonal cut is made in severing rings from the coiled stock is not a sharp angle, sharply pointed ends being objectionable from the standpoint of the users in many trades who prefer washers having substantially plain ends. Furthermore, there are no sharp edged projections, the interlinking being prevented by the several factors outlined above rather than by special shaping of the ends.

While I have described an example of the practice of this invention showing in some detail one form of apparatus for manufacturing washers in accordance with the invention, it will be apparent that the method and apparatus herein described may be varied to a considerable extent without departing from the spirit of the invention as defined in the annexed claims.

Having thus described my invention, I claim:

1. A method of manufacturing non-entangling washers of the split ring type which includes the steps of coiling wire stock to a substantially helical formation, cutting rings from the stock with the successive cuts so applied that the mean circumference of each ring is less than 360°, and subsequently drawing the ends of the rings together by the application of heat so that the mean circumference of each ring is approximately 360°.

2. A method of manufacturing non-entangling washers of the split ring type which includes the steps of coiling wire stock to a substantially helical formation, cutting rings from the stock with the successive cuts applied at a relatively small angle to the axis of the coil and less than 360° apart, and subsequently drawing the ends of the rings together by the application of heat so that the mean circumference of each ring is approximately 360°.

3. A method of manufacturing non-entangling washers of the split ring type which includes the steps of coiling wire stock to a substantially helical formation, cutting rings from the stock with relative turning between the stock and cutting tool whereby the mean circumference of each ring is less than 360°, the plane of the cut being at an angle to the axis of the coil, and subsequently drawing the ends of the rings together by the application of heat to the point where the mean circumference of each ring is approximately 360° yet the ends will not overlap when the ring is compressed.

4. A method of manufacturing non-entangling washers of the split ring type which consists in rolling a wire of spring steel to reduce the cross section thereof to a substantially rectangular shape, coiling the rolled wire to a substantially helical formation, cutting rings from the stock with the successive cuts so applied that the mean circumference of each ring is less than 360°, and subsequently drawing the ends of the rings together by the application of heat to the point where the mean circumference of each ring is approximately 360° yet the ends will not overlap when the ring is compressed.

5. A method of manufacturing non-entangling washers of the split ring type which consists in rolling a wire of spring steel to reduce the cross section thereof to a substantially rectangular shape, coiling the rolled wire to a substantially helical formation, advancing the coil towards a cutting tool thereby to cut individual rings from the stock, concurrently turning the coil in such direction that the number of rings severed from the coil is greater than the number of convolutions of the coil, and subsequently hardening the rings by heating and quenching with incidental drawing of the ends of the rings towards each other.

6. A method of manufacturing non-entangling washers of the split ring type which consists in compressing a wire of spring steel to reduce the cross section thereof to a substantially rectangular shape, then coiling the wire to helical formation, cutting rings from the stock with the successive cuts so applied that the mean circumference of each ring is less than 360°, hardening the rings by heating to a relatively high temperature and quenching, with incidental contraction of the ends of the rings so that the mean circumference of each ring is increased to approximately 360°, and finally tempering the rings by heating them to a lower temperature.

7. A method of manufacturing non-entangling washers of the split ring type which includes the steps of coiling wire stock to a substantially helical formation, cutting rings from the stock by advancing the coil to a position beneath a cutting tool while turning the coil a predetermined amount for each cut whereby the mean circumference of each ring is less than 360°, and subsequently drawing the ends of the rings together by the application of heat so that the mean circumference of each ring is approximately 360°.

8. A method of manufacturing non-entangling washers of the split ring type which includes the steps of coiling wire stock to a substantially helical formation, shearing rings from the stock with the successive cuts applied at an angle to the axis of the coil and with incidental radial fracture of the rings producing substantially convex and concave end faces, and subsequently hardening the rings by heating and quenching with incidental drawing of the ends of the rings towards each other so that the mean circumference of each ring is approximately 360°.

9. A method of manufacturing washers of the split ring type which consists in compressing a wire of spring steel to reduce the cross section thereof to a substantially rectangular shape, coiling the wire to helical formation, cutting rings from the stock with successive parallel cuts forming an angle with the axis of the coil and less than 360° apart, and subsequently heating the rings to a temperature of more than 1000° Fahrenheit, with incidental drawing together of the ends thereof so that the mean circumference of each ring is approximately 360°.

GEORGE K. GARRETT.